(No Model.)
D. S. McCOLLUM.
ANIMAL TRAP.
No. 577,312. Patented Feb. 16, 1897.
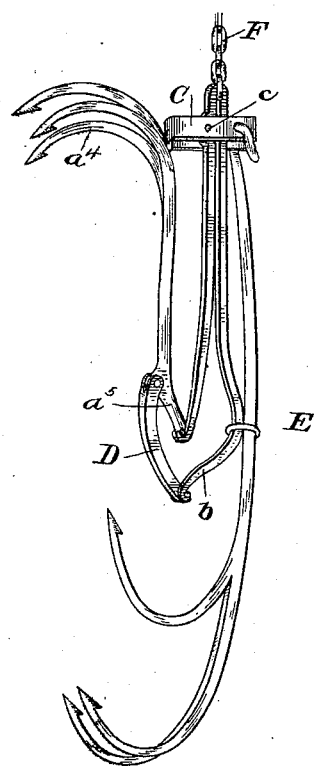
Fig. 1.
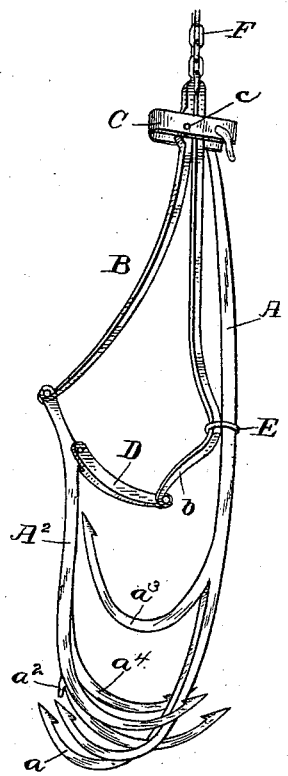
Fig. 2.
Fig. 3.
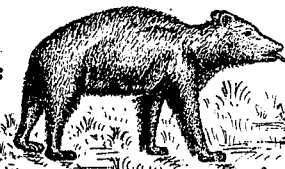
Witnesses:
Inventor:
D. S. McCollum,
his attorney.

UNITED STATES PATENT OFFICE.

DAVID S. McCOLLUM, OF KENO, OREGON.

ANIMAL-TRAP.

SPECIFICATION forming part of Letters Patent No. 577,312, dated February 16, 1897.

Application filed September 1, 1896. Serial No. 604,547. (No model.)

*To all whom it may concern:*

Be it known that I, DAVID S. McCOLLUM, a citizen of the United States, residing at Keno, in the county of Klamath and State of Oregon, have invented certain new and useful Improvements in Animal-Traps; and I do hereby declare the following to be a full, clear, and exact description of the invention, such as will enable others skilled in the art to which it appertains to make and use the same.

This invention relates to animal-traps.

The object is to produce a trap which may be employed for catching large or small game, and which will, in operation, be certain and effective to grasp and retain the animal springing it; furthermore, to produce a trap which shall combine great simplicity of construction with high efficiency and durability in use, and which may be manufactured and sold at a low figure.

In an animal-trap characterized by my invention I employ two sets of hooks, one set of which is spring-actuated, the hooks being adapted, when sprung, to interlock in such manner as to grasp and firmly hold an animal. The actuating-spring constitutes a support or hanger for the two sets of hooks, the sear, and the link connecting the actuating-spring with one of the bars from which the hooks project. The hook-bars comprise each a single piece of metal provided at one end with a trident bearing the barbs, the prongs of the trident being bent to the appropriate curve to form the hooks, and one of the hooks is shorter than the rest to constitute a bait-hook. The bar carrying the bait-hook is swiveled at its upper end to a sear, the latter being in turn swiveled to one member of the spring, so as to permit of its being moved into engagement with the trigger-catch on the movable hook-bar when the trap is set.

Further and more specific details of construction will be hereinafter fully set forth.

In the accompanying drawings, forming a part of this specification and in which like letters of reference indicate corresponding parts, I have illustrated one form of embodiment of my invention, although it is to be understood that other forms of embodiment thereof may be employed without departing from the spirit of the same, and in the drawings—

Figure 1 is a view in perspective showing the trap set. Fig. 2 is a similar view showing the trap sprung. Fig. 3 is a view illustrating the manner in which the trap is placed for operation.

Referring to the drawings, A and $A^2$ designate, respectively, the stationary and the movable grab-hook bars; B, the actuating-spring; C, the sear, and D the link connecting the movable hook-bar $A^2$ with one end of the spring. The stationary bar A is, by preference, formed of a single piece of metal with the hooks $a$ integral therewith, the upper end of the bar being swiveled in the sear and operating to release the same from engagement with the trigger-catch $a^2$ when pressure is brought to bear upon the bait-hook $a^3$, the latter being in this instance shorter than the other two hooks on the bar. The movable grab-hook bar $A^2$ is also, by preference, formed of a single piece of metal with the hooks $a^4$ integral therewith, and the hooks of this bar may all be of the same length, the center one in this instance being provided with the trigger-catch $a^2$. The lower end of this bar is provided with a lug or offset $a^5$, to which is swiveled one end of the link D, the other end of which engages the offset $b$ on the actuating-spring B. The sear C is swiveled to one member, preferably the outer member, of the spring by a pin $c$, as clearly shown in Fig. 2, the space between the pin and the rear ends of the sear being sufficient to permit proper action of the spring. The hook-bar A is held in proper operative relation with the spring by means of a band or ring E, a chain F serving to support the trap from a tree or the like, as shown in Fig. 3.

The operation of the trap is as follows: The movable hook-bar is moved upward until the trigger-catch is in position to engage with the sear, the latter being brought into engagement with the catch by pushing the bar A upward after the bait has been placed upon the bait-hook. The trap may now be suspended from a tree or other support. As soon as the bait is tampered with the sear is released from engagement with the trigger-catch and the movable hook-bar is sprung rapidly downward, thereby driving the hooks of this bar into the back of the neck of the animal and the stationary hooks into its throat. As the hooks are barbed it will be apparent that an animal once caught can never release itself.

While I have described this trap as adapted for catching animals, it is to be understood that the same principle may be applied for trapping fish, the only change required in the structure being to make it smaller.

Having thus fully described my invention, what I claim as new, and desire to secure by Letters Patent, is—

1. An animal-trap comprising an approximately V-shaped spring, a yoke, constituting a sear, pivoted to one of the members of the spring and projecting beyond the sides thereof, a grab-hook bearing-bar connected with one end of the sear, a second grab-hook bearing-bar pivoted to the end of one of the members of the spring, and having a trigger-catch adapted to be brought into engagement with the sear to hold the latter bar raised, and a link connecting the movable hook-bar with the other member of the spring, said spring constituting, at once, a hook-actuating spring and the means for supporting the trap in position for use, substantially as described.

2. An animal-trap comprising an approximately V-shaped spring, a yoke, constituting a sear, pivoted to one of the members of the spring and projecting beyond the sides thereof, a grab-hook bearing-bar connected with one end of the sear, a second grab-hook bearing-bar pivoted to the end of one of the members of the spring, and having a trigger-catch adapted to be brought into engagement with the sear to hold the latter bar raised, a link connecting the movable hook-bar with the other member of the spring, said spring constituting, at once, a hook-actuating spring and the means for supporting the trap in position for use, and a band or ring for holding the spring and stationary hook-bar together, substantially as described.

In testimony whereof I affix my signature in presence of two witnesses.

DAVID S. McCOLLUM.

Witnesses:
 JAMES GARDNER,
 HARRY L. JONES.